US012666370B2

(12) United States Patent
Yang et al.

(10) Patent No.: US 12,666,370 B2
(45) Date of Patent: Jun. 23, 2026

(54) POWER CONTROL FOR TRANSMITTING CONTROL INFORMATION WITH MORE THAN ONE PRIORITY ON AN UPLINK CONTROL CHANNEL

(71) Applicant: QUALCOMM Incorporated, San Diego, CA (US)

(72) Inventors: Wei Yang, San Diego, CA (US); Xiao Feng Wang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 830 days.

(21) Appl. No.: 18/046,490

(22) Filed: Oct. 13, 2022

(65) Prior Publication Data

US 2023/0118758 A1 Apr. 20, 2023

Related U.S. Application Data

(60) Provisional application No. 63/262,617, filed on Oct. 15, 2021.

(51) Int. Cl.
*H04W 52/32* (2009.01)
*H04W 52/10* (2009.01)
*H04W 52/14* (2009.01)

(52) U.S. Cl.
CPC ......... *H04W 52/325* (2013.01); *H04W 52/10* (2013.01); *H04W 52/14* (2013.01)

(58) Field of Classification Search
CPC ......... H04W 52/00–60; H04W 52/325; H04W 52/10; H04W 52/14
See application file for complete search history.

(56) References Cited

U.S. PATENT DOCUMENTS

2006/0093026 A1* 5/2006 Montojo ............. H04W 52/267
375/225
2014/0273862 A1* 9/2014 Maaref ................. H04W 72/20
455/63.1

(Continued)

OTHER PUBLICATIONS

3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. RAN WG1, No. V 16.7.0, Sep. 28, 2021, 188 Pages, XP052056878, Retrieved on Sep. 28, 2021, Section 16.2.1, 16.2.3, 16.2.4.2, 7.6.2, 11.1, 7.2.

(Continued)

*Primary Examiner* — Raymond S Dean
(74) *Attorney, Agent, or Firm* — Paul M. McAdams; Procopio, Cory, Hargreaves & Savitch LLP

(57) ABSTRACT

One apparatus may determine a transmit power for transmitting an uplink control channel transmission including first UCI having a first priority and second UCI having a second priority that is lower than the first priority. The apparatus may further transmit, to a network entity using the transmit power, the uplink control channel transmission including the first UCI having the first priority and the second UCI having the second priority. Another apparatus may transmit, to a UE, uplink power control information configuring at least one value for at least one parameter that is associated with transmit power control on an uplink control channel. The other apparatus may further receive, from the UE based on the uplink power control information, an uplink control channel transmission including first UCI having a first priority and second UCI having a second priority that is lower than the first priority.

26 Claims, 7 Drawing Sheets

(56) References Cited

U.S. PATENT DOCUMENTS

| | | | |
|---|---|---|---|
| 2018/0324716 A1* | 11/2018 | Jeon | H04W 52/50 |
| 2019/0289513 A1* | 9/2019 | Jeon | H04W 72/0453 |
| 2019/0297580 A1* | 9/2019 | Huang | H04L 1/002 |
| 2022/0039088 A1* | 2/2022 | Zhang | H04W 72/21 |
| 2022/0217709 A1* | 7/2022 | Yang | H04L 1/001 |

OTHER PUBLICATIONS

International Search Report and Written Opinion—PCT/US2022/046700—ISA/EPO—Jan. 24, 2023.
Moderator (OPPO) : "Summary#2 of Email Thread [106bis-e-NR-R17-IIoT-URLLC-04]", 3GPP TSG RAN WG1 #106Bis-e, R1-2110472, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 14, 2021, XP052061118, 162 Pages, section 3.2.2.

* cited by examiner

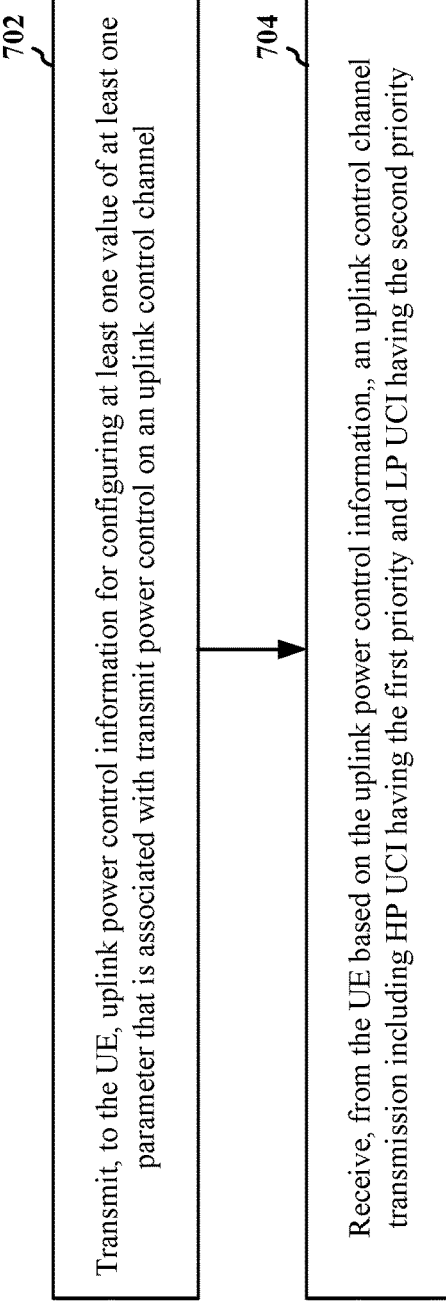

702

Transmit, to the UE, uplink power control information for configuring at least one value of at least one parameter that is associated with transmit power control on an uplink control channel

704

Receive, from the UE based on the uplink power control information,, an uplink control channel transmission including HP UCI having the first priority and LP UCI having the second priority

POWER CONTROL FOR TRANSMITTING CONTROL INFORMATION WITH MORE THAN ONE PRIORITY ON AN UPLINK CONTROL CHANNEL

CROSS REFERENCE TO RELATED APPLICATION(S)

This application claims the benefit of and priority to U.S. Provisional Application Ser. No. 63/262,617, entitled "POWER CONTROL FOR TRANSMITTING CONTROL INFORMATION WITH MORE THAN ONE PRIORITY ON AN UPLINK CONTROL CHANNEL" and filed on Oct. 15, 2021, which is expressly incorporated by reference herein in its entirety.

TECHNICAL FIELD

The present disclosure generally relates to communication systems, and more particularly, to finding a transmit power for transmitting control information with one priority and control information with at least one other priority on an uplink control channel.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or any component thereof. The apparatus may be configured to determine a transmit power for transmitting an uplink control channel transmission including first uplink control information (UCI) having a first priority and second UCI having a second priority that is lower than the first priority. The apparatus may be further configured to transmit, to a network entity using the transmit power, the uplink control channel transmission including the first UCI having the first priority and the second UCI having the second priority.

In another aspect of the disclosure, another method, another computer-readable medium, and another apparatus are provided. The other apparatus may be a network entity or any component thereof. The other apparatus may be configured to transmit, to a UE, uplink power control information configuring at least one value for at least one parameter that is associated with transmit power control on an uplink control channel. The apparatus may be further configured to receive, from the UE based on the uplink power control information, an uplink control channel transmission including first UCI having a first priority and second UCI having a second priority that is lower than the first priority.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flowchart illustrating an example of a method of wireless communication at a network entity.

DETAILED DESCRIPTION

Figure 1:
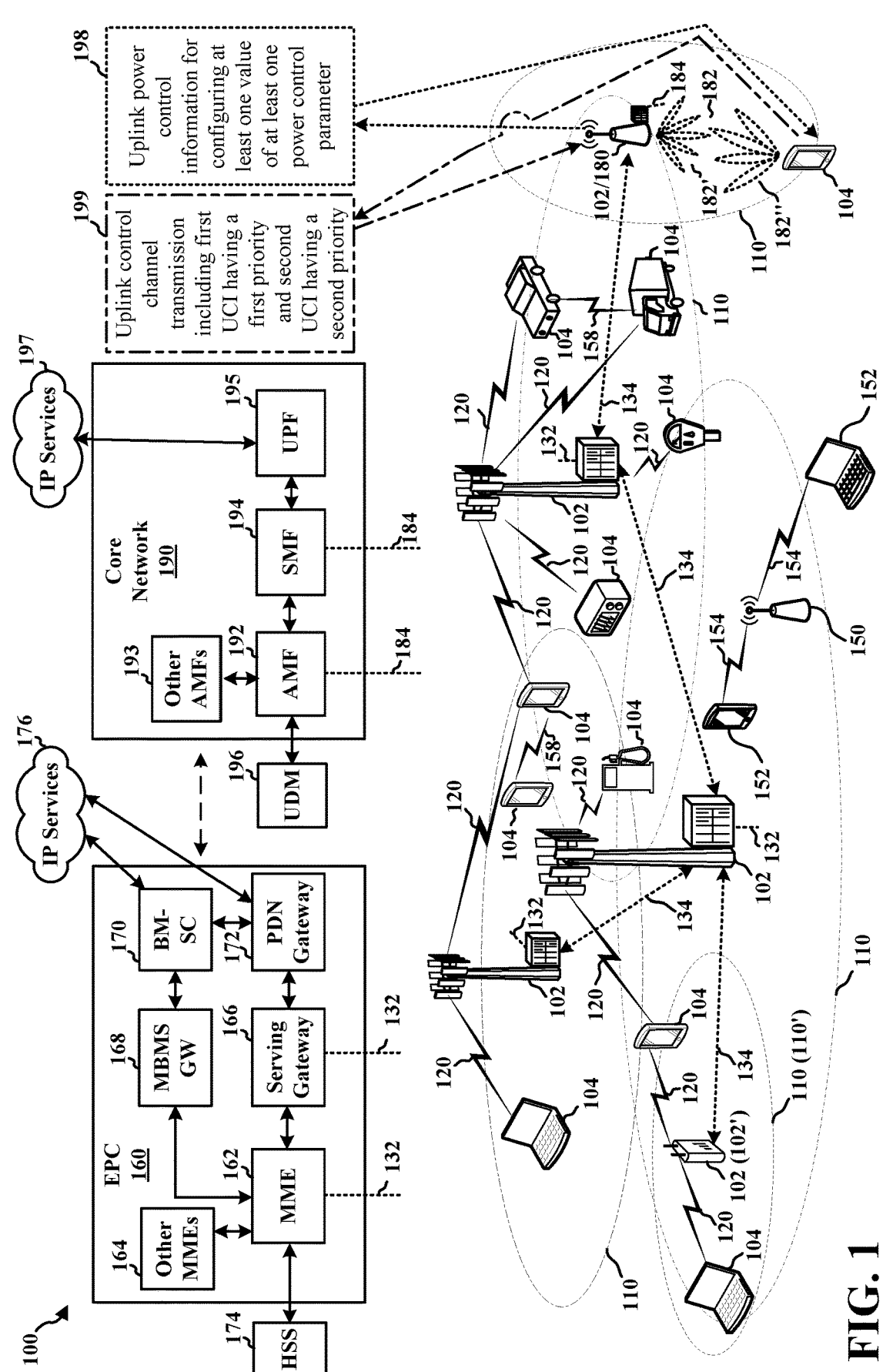
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, these concepts and related aspects may be implemented in the absence of some or all of such specific details. In some instances, well-known structures, components, and the like are shown in block diagram form in order to avoid obscuring such concepts.

Several aspects of telecommunication systems are presented with reference to various apparatus and methods. These apparatus and methods are described herein and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In some radio access and/or other wireless communications systems, such as 5G New Radio (NR), at least two priority levels are defined to serve different uplink traffic having different conditions in terms of reliability, latency, and the like. For example, uplink traffic identified as ultra-reliable low-latency communications (URLLC) may operate according to more stringent conditions than enhanced mobile broadband (eMBB). Illustratively, some traffic (e.g., eMBB traffic)) may be identified as low priority (LP) or priority index 0, whereas some other traffic (e.g., URLLC traffic) may be identified as high priority (HP) or priority index 1.

LP traffic and HP traffic have the potential to collide, such as when LP traffic is scheduled on some resources that overlap with those on which HP traffic is scheduled. In some instances, collisions between HP traffic and LP traffic would result in the LP traffic being entirely preempted and dropped so that the HP traffic could quickly and easily be served. For example, LP traffic may be dropped when the LP traffic collides with HP traffic in the same physical uplink control channel (PUCCH) group.

Such an approach may result in LP traffic being lost or dropped, which may be inefficient and wasteful in terms of resource utilization. Therefore, some access/wireless networks may be configured to accommodate HP traffic multiplexed with LP traffic, such as on a PUCCH or similar control channel transmission. In some aspects, HP traffic may be encoded separately from LP traffic with which the HP traffic is multiplexed—e.g., the HP traffic may be encoded with a lower code rate than the LP traffic.

While multiplexing LP traffic with HP traffic in uplink control channel transmissions may increase the amount of LP traffic being served and reduce resource utilization inefficiencies, an issue arises in terms of transmit power control. In particular, the different purposes for which HP traffic and LP traffic are used and respective commensurate constraints to which each is expected to adhere may frequently result in disparities in configurations between the two. For example, HP traffic may be encoded with a lower code rate than that of LP traffic in order to increase reliability, the HP traffic may be scheduled and/or transmitted in smaller increments than the LP traffic in order to increase throughput, and so forth. Therefore, a need exists for approaches to more effectively and efficiently serve traffic having at least two different priorities when the mixed priority traffic is multiplexed.

The present disclosure describes various techniques and solutions for transmit power control for traffic of at least two different priorities that is multiplexed for transmission. For example, such traffic may include uplink control information (UCI) that is identified as HP and UCI that is identified as LP multiplexed in an uplink control channel transmission. However, transmit power control may be dependent upon the rate of transmission (e.g., code rate), which may differ between the HP UCI and LP UCI, as well as dependent upon the size of scheduled transmission (e.g., payload size). As HP and LP traffic may often be separately encoded and/or have different numbers of bits, the present disclosure provides some solutions reconciling the differences between the two. For example, the present disclosure provides for various mechanisms for finding a transmit power that is suitable for the code rates that may differ between the HP and LP UCIs and/or the payload sizes that may differ between the HP and LP UCIs.

While the present disclosure describes many concepts and various aspects in the context of UCI on a control channel (e.g., PUCCH), the concepts and various aspects presented herein may be applicable to other traffic apart from or in addition to UCI, other transmission schemes apart from or in addition to encoding (e.g., redundant/forward error correction codes), other channels apart from or in addition to uplink control channels (e.g., PUCCH), and so forth.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, a CU may implement some or all functionality of a radio resource control (RRC) layer, whereas a DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. With such a connection to the EPC 160 and/or core network 190, a base station 102 operating as an IAB donor may provide a link to the EPC 160 and/or core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." In some aspects, two or more geographic coverage areas 110 may at least partially overlap with one another, or one of the geographic coverage areas 110 may contain another of the geographic coverage areas. For example, the small cell 102′ may have a coverage area 110′ that overlaps with the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102, whether a small cell 102' or a large cell (e.g., macro base station), may include and/or be referred to as an eNB, gNodeB (gNB), or another type of base station. Some base stations 180, such as gNBs, may operate in a traditional sub 6 GHz spectrum, in mmW frequencies, and/or near-mmW frequencies in communication with the UE 104. When such a base station 180 (e.g., gNB) operates in mmW or near-mmW frequencies, the base station 180 may be referred to as a mmW base station. The (mmW) base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a network entity, network node, gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, a base station 102/180 may be configured to transmit, to a UE 104, uplink power control information 198 for configuring at least one value of at least one parameter that is associated with transmit power control on an uplink control channel. The base station 102/180 may be further configured to receive, from the UE 104 based on the uplink power control information 198, an uplink control channel transmission 199 including first UCI having a first priority and second UCI having a second priority that is lower than the first priority.

Correspondingly, the UE 104 may be configured to determine a transmit power for transmitting an uplink control channel transmission 199 including first UCI having a first priority and second UCI having a second priority that is lower than the first priority. The UE 104 may be further configured to transmit, to the base station 102/180 using the transmit power, the uplink control channel transmission 199 including the first UCI having the first priority and the second UCI having the second priority. In some aspects, the UE 104 may determine the transmit power based on the uplink power control information 198 for configuring at least one value of at least one parameter associated with transmit power control on the uplink control channel.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figures 2A, 2B, 2C, 2D:
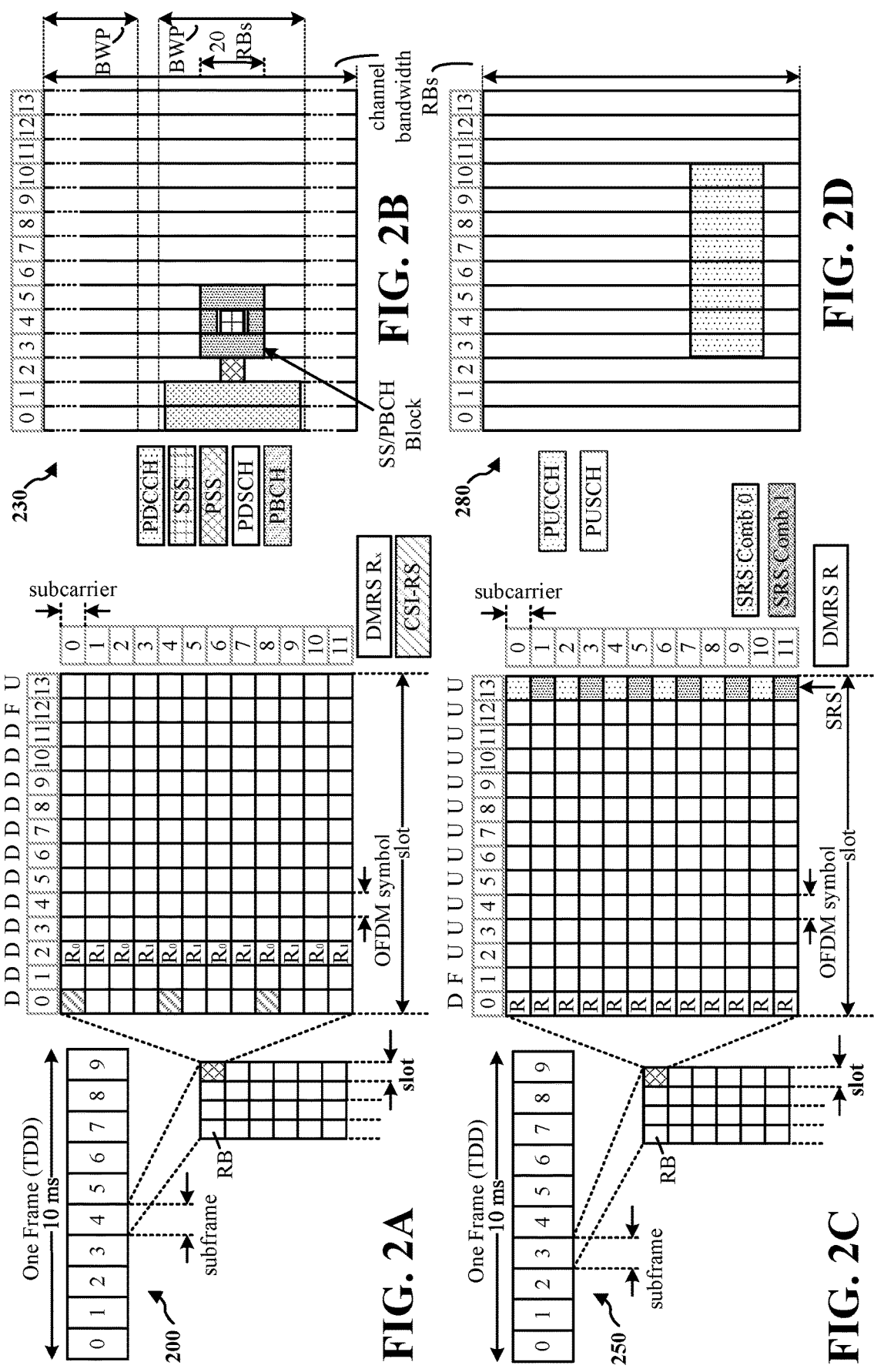
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100x is the port number, but other DM-RS configurations are possible) and/or or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
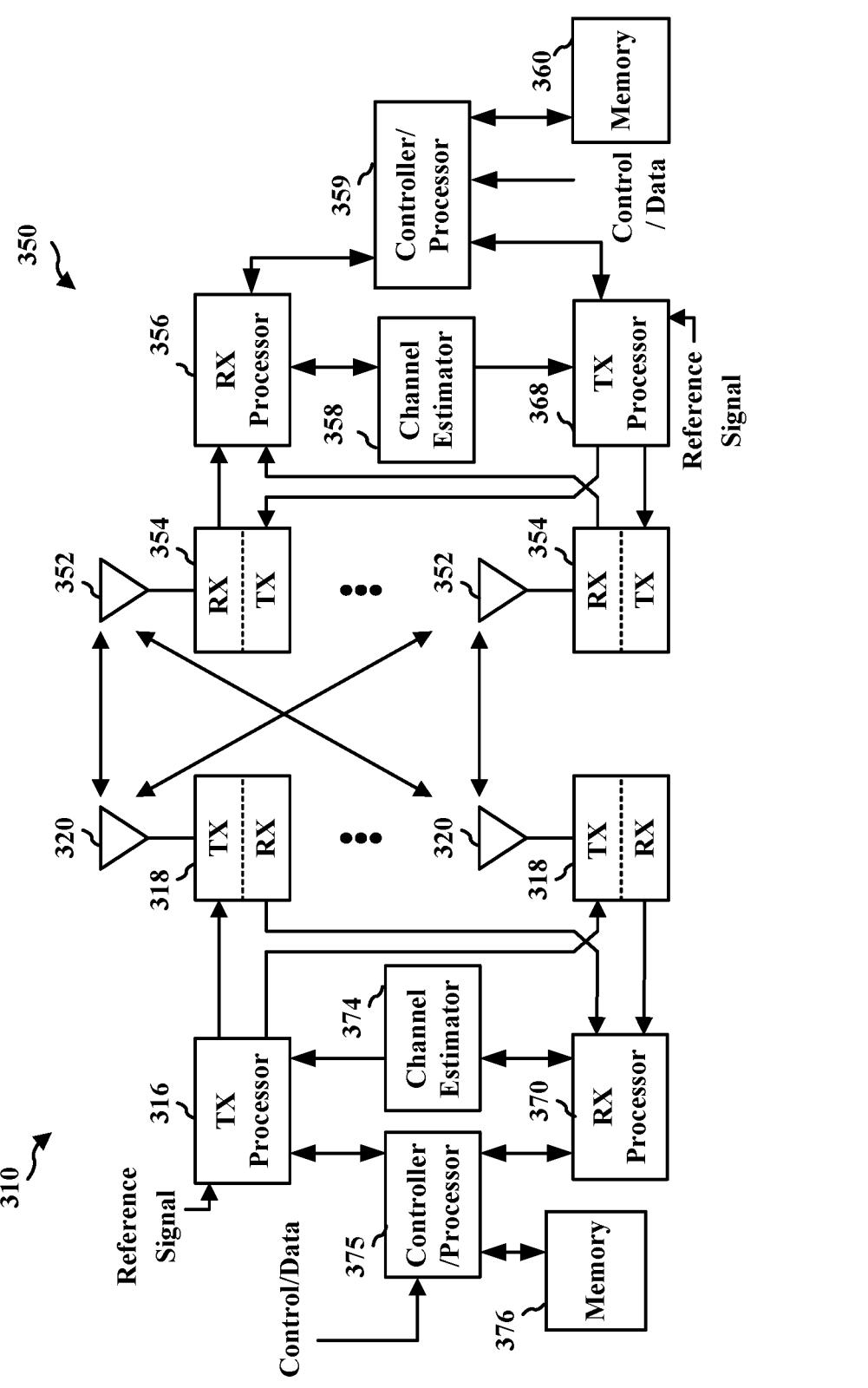
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), resegmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with receiving the uplink power control information 198 for configuring at least one value of at least one parameter associated with transmit power control on the uplink control channel and/or transmitting the uplink control channel transmission 199 including the first UCI having the first priority and the second UCI having the second priority based on determining a transmit power, as described with respect to FIG. 1, supra.

In some other aspects, at least one of the TX processor 316, the RX processor 370, and the controller/processor 375 may be configured to perform aspects in connection with transmitting the uplink power control information 198 for configuring at least one value of at least one parameter associated with transmit power control on the uplink control channel and/or receiving the uplink control channel transmission 199 including the first UCI having the first priority and the second UCI having the second priority based on the uplink power control information 198, as described with respect to FIG. 1, supra.

Figure 4:
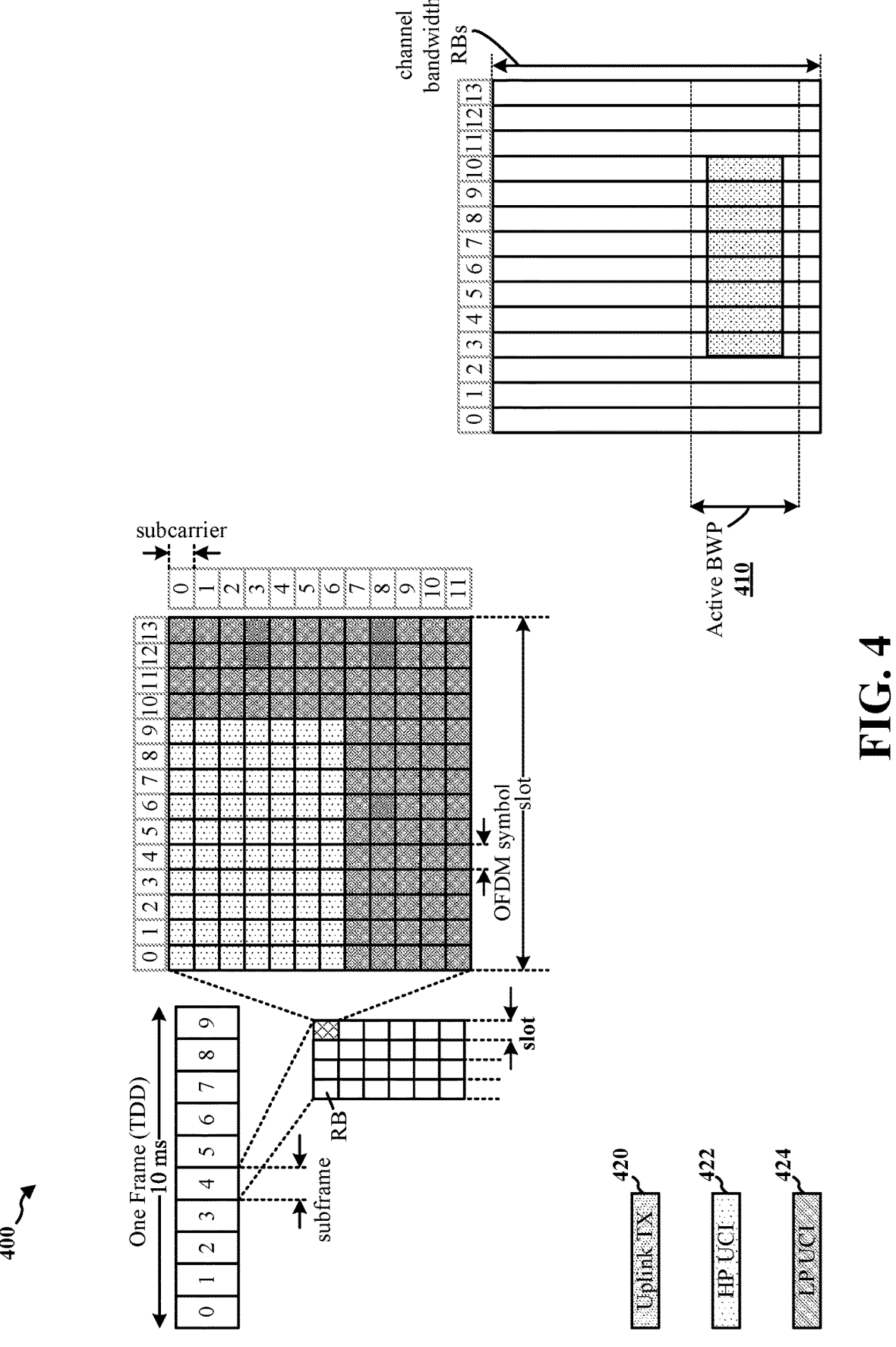
FIG. 4 is a diagram illustrating an example of uplink control information (UCI) having one priority multiplexed with UCI having at least one other priority on an uplink control channel.

FIG. 4 is a diagram 400 illustrating an example of UCI 422 having one priority multiplexed with UCI 424 having at least one other priority on an uplink control channel. By way of illustration and not limitation, the one priority may be HP, which may be considered to be higher or of greater importance relative to the other priority, which may be LP.

Some radio access and/or other wireless networks or technologies may serve some or all uplink traffic having one set of conditions (e.g., conditions related to minimum allowable throughput, maximum allowable error rate, etc.) differently from some or all uplink traffic having another set of conditions. In the illustrated example, HP UCI 422 may be identified as HP and/or priority index 1, which may be used for URLLC, while LP UCI 424 may be identified as LP or priority index 0, which may be used for eMBB.

According to various aspects, UCI may include one or more of HARQ ACK information, SR, and/or CSI (e.g., a CSI report indicating one or more of RI, PMI, and/or CQI). Thus, the HP UCI 422 may include one or more of HP HARQ ACK information, HP SR, and/or HP CSI. Similarly, the LP UCI 424 may include one or more of LP HARQ ACK information, LP SR, and/or LP CSI.

The LP UCI 424 and the HP UCI 422 have the potential to collide, such as when the LP UCI 424 is scheduled on some resources that overlap with those on which the HP UCI 422 is scheduled. In some aspects, rather than handling collisions between the HP UCI 422 and the LP UCI 424 by entirely preempting and/or dropping the LP UCI 424 so that the HP UCI 422 can be quickly and reliably communicated, the HP UCI 422 and the LP UCI 424 may be multiplexed in a transmission on an uplink control channel (e.g., PUCCH). For example, the HP UCI 422 and the LP UCI 424 may be multiplexed in the same PUCCH resource.

According to various different aspects, the HP UCI 422 and LP UCI 424 may be considered as multiplexed in the same transmission 420 where bits of the HP UCI 422 and bits of the LP UCI 424 are transmitted in a single uplink control channel (e.g., PUCCH) transmission, a single uplink data and/or shared channel (e.g., PUSCH) transmission, a single slot, a single subframe, a single frame, and/or a single physical resource (e.g., PRB) or single set of physical resources (e.g., single set of PRBs). For example, a single transmission may include one or more physical resources on which a PUCCH transmission and/or a PUCCH resource is scheduled, and the physical resources may include a set of REs.

In some aspects, the HP UCI 422 may be multiplexed with the LP UCI 424 in the transmission 420 where the HP UCI 422 is transmitted on a first subset of REs of the set of REs and the LP UCI 424 is transmitted on a second subset of REs of the set of REs. The first and second subsets of REs may be different and may be non-overlapping in the transmission 420, and each of the first and second subsets of REs may be contiguous or non-contiguous in terms of time (e.g., symbols) and/or frequency (e.g., subcarriers).

In some other aspects, the HP UCI 422 may be differently and/or further multiplexed with the LP UCI 424 in the transmission 420. For example, the HP UCI 422 may be multiplexed with the LP UCI 424 in the transmission 420 by concatenating, aggregating, interleaving, and/or combining some or all of the HP UCI 422 with some or all of the LP UCI 424. Other approaches to multiplexing the HP UCI 422 with the LP UCI 424 may additionally or alternatively be employed without departing from the scope of the present disclosure.

The multiplexed HP UCI 422 and LP UCI 424 may be transmitted in an active BWP 410 on resources scheduled, reserved, or otherwise allocated to such uplink transmissions. For example, the multiplexed HP UCI 422 and LP UCI 424 may be transmitted in a same PUCCH resource and/or using the same PUCCH format of the available PUCCH formats. Illustratively, the PUCCH formats for the uplink transmission 420 may be given by the following Table 1:

TABLE 1

| PUCCH Format | Length (in # of OFDM symbols) | #UCI bits | Waveform | Description |
|---|---|---|---|---|
| 0 | 1-2 | ≤2 | CGS seq | Short PUCCH format with 1-2 bits UCI |
| 1 | 4-14 | ≤2 | CGS seq | Long PUCCH format with 1-2 bits UCI (TD-OCC) |
| 2 | 1-2 | >2 | OFDM | Long PUCCH format with >2 bits UCI |
| 3 | 4-14 | >2 | DFT-S-OFDM | Long PUCCH format with >2 bits UCI (no multi-UE multiplexing/ multi-user capability) |
| 4 | 4-14 | >2 | DFT-S-OFDM | Long PUCCH format with >2 bits UCI (supports multi-UE multiplexing/ multi-user capability) |

Figure 5:
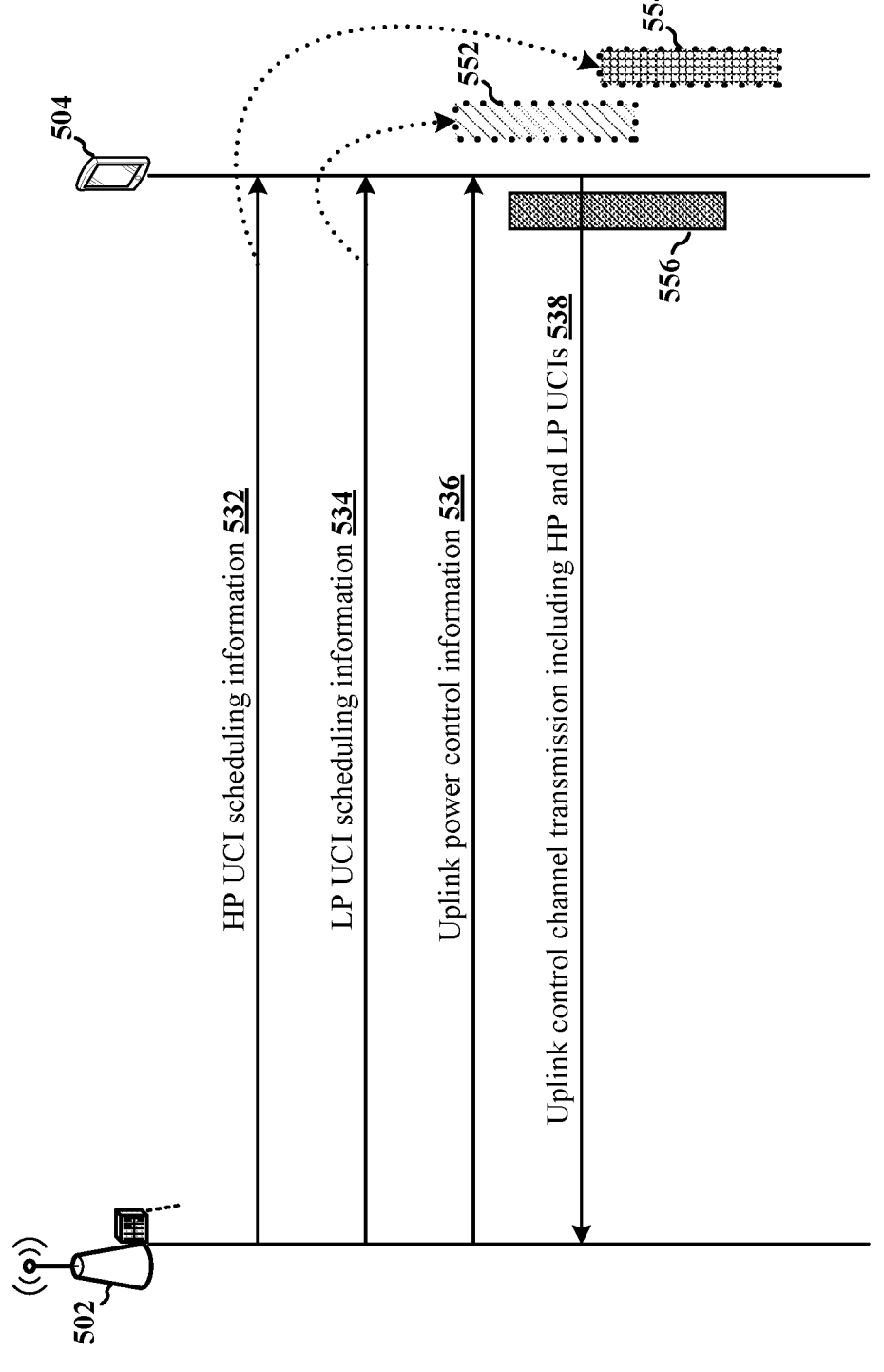
FIG. 5 is a call flow diagram illustrating an example operational flow of transmit power control for an uplink control channel transmission including UCI of one priority multiplexed with UCI of another priority on an uplink control channel.

FIG. 5 is a call flow diagram 500 illustrating an example operational flow of transmit power control for an uplink control channel transmission 538 including UCI of one priority multiplexed with UCI of another priority on an uplink control channel.

The base station 502 may transmit scheduling information to the UE 504 that indicates resources on which the UE 504 is to transmit uplink data and/or control information to the base station 502. In some instances, different UCIs may be of different types and/or may arrive at lower layers of the UE 504 at different times, and may therefore be separately scheduled for uplink transmission. As illustrated, the base station 502 may transmit HP UCI scheduling information 532 that indicates scheduled resources 552 on which the UE 504 may transmit the HP UCI 422. The HP UCI scheduling information 532 may indicate a PUCCH resource, a PUCCH identifier (ID), and/or other information configuring the UE 504 to transmit the HP UCI 422 on the HP UCI scheduled resources 552.

Similarly, the base station 502 may transmit LP UCI scheduling information 534 that indicates scheduled resources 554 on which the UE 504 may transmit the LP UCI 424. The LP UCI scheduling information 534 may indicate a PUCCH resource, a PUCCH ID, and/or other information configuring the UE 504 to transmit the LP UCI 424 on the LP UCI scheduled resources 554.

In some aspects, the UE 504 may determine that HP UCI 422 and the LP UCI 424 are to be multiplexed onto the same set of resources in a single transmission. For example, where the HP UCI scheduled resources 552 at least partially overlap in time with the LP UCI scheduled resources 554, the UE 504 may determine that the HP UCI 422 and LP UCI 424 are to be multiplexed in the same uplink control channel transmission 538.

The uplink control channel transmission 538 may be scheduled on one of the HP UCI scheduled resources 552, the LP UCI scheduled resources 554, or a third set of resources that is at least partially different from the HP UCI scheduled resources 552 and the LP UCI scheduled resources 554. For example, the base station 502 may transmit additional scheduling information that schedules the HP UCI 422 and the LP UCI 424 on one set of uplink control channel resources on a mixed-priority UCI set of resources 556. In so doing, the HP UCI 422 and the LP UCI 424 may be scheduled in a same PUCCH resource and/or in a transmission having one PUCCH ID. The PUCCH resource 556 may be selected from a set of PUCCH resources configured to transmit HP UCI.

The UE 504 may multiplex the HP UCI 422 with the LP UCI 424 in the uplink control channel transmission 538 for transmission on the mixed-priority UCI set of resources 556. However, the UE 504 may determine an uplink transmit power at which to transmit the uplink control channel transmission 538 before transmitting on the mixed-priority UCI set of resources 556.

In some radio access and/or other wireless networks and technologies (e.g., 5G NR), uplink transmit power may be controlled based on various factors, e.g., to balance reliable communication with the need to mitigate interference. Transmit power control on an uplink control channel (e.g., PUCCH) may be governed by the following Equation 1, which may be evaluated to derive a transmit power, expressed as a power level in units, such as decibels (dB), decibel-milliwatts (dBm), or another unit of measure, at which a UE 504 is to transmit to a base station 502 (e.g., network entity) on an uplink control channel (e.g., PUCCH):

$$P_{PUCCH} = \min\left\{ \begin{matrix} P_{C,max}, \\ P_0(j) + PL(q) + 10\log_{10}(2^\mu M_{RB}) + \Delta_F + \Delta_{TF} + g(l) \end{matrix} \right\}[\text{units}] \quad \text{Equation 1}$$

In Equation 1, $P_{C,max}$ is the maximum transmit power; $P_0$ (j) is an open-loop power control parameter (e.g., the intended receive power at the base station 502, as indicated thereby) with j being an index (e.g., a parameter set configuration index) corresponding to a value of the open-loop power control parameter; PL(q) is an indication of the path loss (e.g., as measured by the UE 504 from downlink RSs received from the base station 502) with q being a path loss index (e.g., associated with beam-based power control) corresponding to a value to indicate the path loss; μ is the subcarrier spacing; $M_{RB}$ is the number of RBs of the uplink control channel transmission 538 (e.g., PUCCH transmission bandwidth); $\Delta_F$ is a delta parameter specific to the PUCCH format of the uplink control channel transmission 538, which may be configured via RRC signaling from the base station 502; $\Delta_{TF}$ is a power adjustment parameter indicative of a delta power based on the spectral efficiency of the uplink control channel transmission 538 and the PUCCH format thereof; and g(l) is a closed-loop power control parameter with l being an index corresponding to a value to indicate a PUCCH power control adjustment state. In some aspects, one or more additional parameters, variables, values, or the like may be included in Equation 1; one or more parameters, variables, values, or the like shown in Equation 1 may be excluded from Equation 1; or any combination thereof.

The power adjustment parameter $\Delta_{TF}$ indicative of a delta power based on the spectral efficiency of the uplink control channel transmission 538 and the PUCCH format thereof may be found for PUCCH formats 2-4 based on the number of UCI bits (e.g., the sum of the bits of the HP UCI 422 and the LP UCI 424, including any cyclic redundancy check (CRC) bits). When the total number of UCI bits is greater than eleven (11), the power adjustment parameter $\Delta_{TF}$ may be found according to the following Equation 2:

$$\Delta_{TF} = 10 \log_{10}(2^{BPRE \cdot K_2} - 1) \qquad \text{Equation 2}$$

In the foregoing Equation 2, $K_2$ may be a preconfigured value or constant value (e.g., 2.4). In some aspects, $K_2$ may be defined in a standard or technical specification, such as those promulgated by Third Generation Partnership Project (3GPP). In some aspects, one or more additional parameters, variables, values, or the like may be included in Equation 2; one or more parameters, variables, values, or the like shown in Equation 2 may be excluded from Equation 2; or any combination thereof.

Also for PUCCH formats 2-4, when the total number of UCI bits is greater than two (2) and less than or equal to eleven (11), the power adjustment parameter $\Delta_{TF}$ may be found according to the following Equation 3:

$$\Delta_{TF} = 10 \log_{10}(BPRE \cdot K_1), \text{ where } K_1 \text{ may be a precon-} \\ \text{figured value.} \qquad \text{Equation 3}$$

In the foregoing Equation 3, $K_1$ may be a scale factor that may be preconfigured or constant or may be signaled to the UE 504 by the base station 502 (e.g., via RRC signaling, in a SIB, etc.). In some aspects, $K_1$ may be defined in a standard or technical specification, such as those promulgated by 3GPP. In some aspects, one or more additional parameters, variables, values, or the like may be included in Equation 3; one or more parameters, variables, values, or the like shown in Equation 3 may be excluded from Equation 3; or any combination thereof.

In both of the foregoing Equation 2 and Equation 3, BPRE is the bits per RE and may be indicative of the rate or spectral efficiency of the uplink control channel transmission 538. The bits per RE BPRE may be given by the following Equation 4:

$$BPRE = \frac{\#UCI \text{ bits}}{N_{RE}} \qquad \text{Equation 4}$$

In the foregoing Equation 4, #UCI bits is the number of bits of the HP UCI 422 or LP UCI 424 including any CRC bits, and $N_{RE}$ is the number of REs used to transmit the HP UCI 422 and LP UCI 424. In some aspects, one or more additional parameters, variables, values, or the like may be included in Equation 4; one or more parameters, variables, values, or the like shown in Equation 4 may be excluded from Equation 4; or any combination thereof.

The power adjustment parameter $\Delta_{TF}$ indicative of a delta power based on the spectral efficiency of the uplink control channel transmission 538 and the PUCCH format thereof may be found for PUCCH formats 0 and 1 according to the following Equation 5:

$$\Delta_{TF} = 10 \log_{10}\left(\frac{N_{ref}}{N_{symbol}^{PUCCH}}\right) + 10 \log_{10}(O_{UCI}) \qquad \text{Equation 5}$$

In the foregoing Equation 5, $N_{ref}$ is a one constant or preconfigured value for PUCCH format 0 (e.g., 2) and another constant or preconfigured value for PUCCH format 1 (e.g., 14). In some aspects, the value(s) of $N_{ref}$ may be defined in a standard or technical specification, such as those promulgated by 3GPP. Further, $O_{UCI}$ denotes #UCI bits, which is the number of bits of the HP UCI 422 and LP UCI 424 including any CRC bits. $N_{symbol}^{PUCCH}$ denotes the number of symbols for the uplink control channel transmission 538. In some aspects, one or more additional parameters, variables, values, or the like may be included in Equation 5; one or more parameters, variables, values, or the like shown in Equation 5 may be excluded from Equation 5; or any combination thereof.

The base station 502 may transmit, and the UE 504 may receive, uplink power control information 536 for configuring at least one value of at least one parameter that is associated with transmit power control on an uplink control channel. For example, the base station 502 may transmit, and the UE 504 may receive, one or more values of one or more parameters illustrated in the foregoing Equations 1-5 and/or information upon which one or more of the values may be based.

In accordance with the present disclosure, a network node (e.g., a UE or a base station) may be configured to determine one or more parameter values for one or more parameters associated with one or more of Equations 1-5 in order to support both HP UCI and LP UCI on the uplink control channel. Such determinations, as described herein, may enable support of HP UCI and LP UCI that are separately encoded with different BPRE.

In some aspects, the differences from separately encoding the HP UCI 422 and LP UCI 424 can be reconciled using various options. In an Option A, power control parameters may be configured with either a first set of power control parameter values associated with the HP UCI 422 or a second set of power control parameter values associated with the LP UCI 424. One or more power control parameters of at least one of Equations 1-5 may be transmission, time, and/or frequency variant, e.g., as path loss, spectral efficiency (e.g., for BPRE), etc. may be different on the HP UCI scheduled resources 552 than on the LP UCI scheduled resources 554, the HP UCI 422 may include a payload that is of a different size than a payload of the LP UCI 424, so forth.

Thus, in order to calculate the appropriate transmit powers for the HP UCI 422 and for the LP UCI 424 scheduled on the same uplink control channel resource, the UE 504 may determine and/or receive the first set of power control parameter values, which are associated with HP UCI 422, and the second set of power control parameter values, which are associated with the LP UCI 424. For the first option, the UE may elect to use the first set of power control parameters values associated with the HP UCI 422, e.g., to facilitate the HP UCI 422 in fulfilling the use case expectations incumbent upon the UE 504 for HP UCI transmission (e.g., URLLC expectations). The UE 504 may refrain from and/or drop the second set of power control parameter values associated with the LP UCI 424.

In another Option B, the UE 504 may use the first set of power control parameter values to calculate a first transmit power for the HP UCI 422, and the UE 504 may also use the second set of power control parameter values to calculate a second transmit power for the LP UCI 424. The UE 504 may then compare the first and second transmit powers, and may select the larger between the two to use with the uplink control channel transmission 538 on the mixed-priority UCI scheduled resources 556.

However, neither Option A nor Option B can be said to fully reconcile the differences between the HP UCI 422 and the LP UCI 424 because the HP UCI 422 and LP UCI 424 may be of different sizes (e.g., in terms of number of bits), and so may be assigned to different PUCCH formats. For example, if one or both of the HP UCI 422 and/or the LP UCI 424 include payloads that are less than or equal to a threshold (e.g., a threshold of two bits), then the one or both of the HP UCI 422 and/or LP UCI 424 may be assigned PUCCH format 0, 1, or another value. If one of the HP UCI 422 or the LP UCI 424 includes a payload greater than the threshold, then that one of the HP UCI 422 or LP UCI 424 may be assigned PUCCH format 2 or 3 or 4. The discrepancies between payload sizes and/or PUCCH formats may result in other problems and/or inaccuracies when calculating a transmit power control for the mixed-priority UCI scheduled resources 556.

One approach to addressing the foregoing problems and/or inaccuracies may include a power control formula and/or values for separately encoded HP UCI 422 and LP UCI 424 with one of PUCCH formats 2, 3, or 4. In some aspects, one or more equations disclosed herein may be used or modified. For example, Equation 3 may be reused to find $\Delta_{TF}$, and $K_1$ may be configured (or preconfigured) to a value facilitating calculation of BPRE associated with a UCI payload of 1-2 bits (e.g., $K_1$ may be equal to 6).

However, a difference in coding gain between a UCI payload of 1-2 bits and a UCI payload of 3-11 bits may arise. For example, NR Reed-Muller code for six (6) information bits may have a net coding gain of 4.77 dB in comparison with one (1) information bit, which implies that an additional received power per bit of 4.77 dB may be needed to transmit a UCI payload of 1 bit relative to a UCI payload of 6 bits. Consequently, if the base station 502 were to configure one or more power control parameters for a UCI payload of 1 bit, the UE 504 may use an additional 4.77 dB more than needed for a UCI payload of 6 bits, which leads to wasted transmit power or higher interferences to other UEs/other base stations. Correspondingly, if the base station 502 were to configure one or more power control parameters for a UCI payload of 3-11 bits, the UE 504 may transmit a UCI payload of 1 bit with a power that is 4.77 dB less than needed to decode the 1-bit UCI payload, thus leading to erroneous reception.

Another approach to addressing the foregoing problems and/or inaccuracies may include using a closed-loop power control mechanism to compensate for the power difference between a UCI transmission having a first number of bits (e.g., 1-2 bits) and a UCI transmission having a second number of bits (e.g., 3-11 bits). The base station 502 may dynamically configure a closed-loop power delta between different transmissions on the channel (e.g., PUCCH) if those transmissions fall into different payload ranges—e.g., the 1-2 bit range, as with PUCCH formats 0-1, or the 3-11 bit range, as with PUCCH formats 2-4. This approach may be unsuitable, however, because closed-loop power control has a dynamic range of only 4 dB (e.g., from −1 to 3 dB), and that range is insufficient to adjust the transmit power to accommodate a power difference of 4.77 dB that may occur with the different payload sizes.

As described in the present disclosure, the problems, inaccuracies, and/or other issues arising from calculation of a transmit power for a transmission including HP UCI multiplexed with LP UCI may be managed by treating some instances of mixed payload sizes differently from other instances of mixed payload size. In particular, where the UE 504 multiplexes HP UCI and LP UCI with one of PUCCH formats 2-4, the UE 504 may compute the transmit power differently for the following two cases: Case 1, in which at least one of the HP UCI or the LP UCI has a payload having a first size (e.g., 1-2 bits in some aspects; or N bits, where N may be equal to 2 in some aspects or may be a value less than or greater than 2 in some other aspects); and Case 2, in which each of the HP UCI and the LP UCI has a payload having a respective size greater than the first size (e.g., greater than 2 bits in some aspects; or greater than the N bits in other aspects). Reference to specific values herein are just examples. As one example, with respect to Option 4 and elsewhere, reference to the number of bits are examples of different payload sizes.

Depending on whether Case 1 or Case 2 is applicable, one or more of the following options can be employed when finding the transmit power according to Equation 1.

In Option 1, the open-loop power control parameter $P_0$ may be configured with a first value for an uplink control channel resource if Case 1 is applicable, but may be configured with a second value for the same uplink control channel resource if Case 2 is applicable. The first and second values may be unequal. The difference between the first value and the second value may correspond to a coding gain difference (which may also be referred to as a power boost offset). In some aspects, the base station 502 may transmit, and the UE 504 may receive, uplink power control information 536 that includes information for configuring the first value of the open-loop power control parameter $P_0$ for Case 1 and the second value of the open-loop power control parameter $P_0$ for Case 2.

In Option 2, similarly to Option 1, the delta parameter $\Delta_F$ specific to the PUCCH format may be configured with a first value for an uplink control channel resource if Case 1 is applicable, but may be configured with a second value for the same uplink control channel resource if Case 2 is applicable. The first and second values may be unequal. The difference between the first value and the second value may correspond to a coding gain difference (which may also be referred to as a power boost offset). In some aspects, the base station 502 may transmit, and the UE 504 may receive, uplink power control information 536 that includes information for configuring the first value of the delta parameter $\Delta_F$ for Case 1 and the second value of the delta parameter $\Delta_F$ for Case 2.

In Option 3, if Case 1 is applicable, then the scale factor $K_1$ used to calculate the power adjust parameter $\Delta_{TF}$ may be replaced in Equation 3 by a scale factor $K_1'$ having a different value than $K_1$. $K_1'$ may be unequal to a value, such as 6, in some aspects. As another example, the scale factor $K_1'$ may be greater than the scale factor $K_1$ in some aspects. The difference between $K_1$ and $K_1'$ may correspond to a coding gain difference (which may also be referred to as a power boost offset). In some aspects, the scale factor $K_1'$ for Case 1 may be preconfigured in memory or storage of the UE 504. In some other aspects, the base station 502 may transmit, and the UE 504 may receive, uplink power control information 536 that indicates the scale factor $K_1'$ having a different value than $K_1$. For Case 2 in Option 3, the UE 504 may reuse Equation 3 without changing the scale factor $K_1$ to calculate the power adjust parameter $\Delta_{TF}$.

In Option 4, for Case 1, the UE may determine at least one value of at least one of the open-loop power control parameter $P_0$, the delta parameter $\Delta_F$, and/or the power adjust parameter $\Delta_{TF}$ to be used in Equation 1 based on at least one corresponding value of the open-loop power control parameter $P_0$, the delta parameter $\Delta_F$, and/or the power adjust parameter $\Delta_{TF}$ associated with the earlier scheduled HP UCI scheduled resources 552, if the payload of the HP UCI 422 is 1-2 bits, or associated with the earlier scheduled LP UCI scheduled resources 554, if the payload of the LP UCI 424 is 1-2 bits.

If both payloads of the HP UCI 422 and LP UCI 424 are 1-2 bits, but the sum of the payloads is greater than 2 bits, then the UE 504 may use the corresponding value(s) of the open-loop power control parameter $P_0$, the delta parameter $\Delta_F$, and/or the power adjust parameter $\Delta_{TF}$ associated with the earlier scheduled HP UCI scheduled resources 552.

Referring to Options 1 and 2, supra, the base station 502 may determine the respective two different values with which to configure the open-loop power control parameter $P_0$ and/or the delta parameter $\Delta_F$ are to be configured for Case 1 and Case 2. In some instances, the base station 502 may calculate a respective first value $$\left(\text{e.g., } P_0^{(1)} \text{ and/or } \Delta_F^{(1)}\right)$$

with which to configure the open-loop power control parameter $P_0$ and/or the delta parameter $\Delta_F$ for Case 1 based on an offset from a respective second value $$\left(\text{e.g., } P_0^{(2)} \text{ and/or } \Delta_F^{(2)}\right)$$

with which to configure the open-loop power control parameter $P_0$ and/or the delta parameter $\Delta_F$ for Case 2. For example, the base station 502 may calculate the first value for the open-loop power control parameter as $$P_0^{(1)} = P_0^{(2)} + \text{power boost offset}$$

(e.g., the power boost offset may be equal to 4.77 dB).

The base station 502 may transmit, and the UE 504 may receive, uplink power control information 536 that includes or indicates at least one of the values $$P_0^{(1)} \text{ and/or } P_0^{(2)}$$

with which to configure the open-loop power control parameter $P_0$ and/or at least one of the values $$\Delta_F^{(1)} \text{ and/or } \Delta_F^{(2)}$$

with which to configured the delta parameter $\Delta_F$ for Equation 1.

In some instances, such as Option A, supra, the UE 504 may determine the transmit power for the uplink control channel transmission 538 on the mixed-priority UCI scheduled resources 556 based on one or more parameter values associated with the HP UCI 422 and not based on any parameter values associated with the LP UCI 424. For example, the UE 504 may determine one or more of the open-loop power control parameter $P_0$, the delta parameter $\Delta_F$, and/or the power adjustment parameter $\Delta_{TF}$ based on only those values associated with the HP UCI 422. For example, the UE 504 may find the delta parameter $\Delta_F$ based on the BPRE associated with the HP UCI 422, and not the LP UCI 424.

In such instances, Case 1 may instead apply where HP UCI has 1-2 bits, whereas Case 2 may instead apply where HP UCI has greater than 2 bits. In other words, in some aspects, the size of LP UCI may be excluded as a factor for categorizing UCI into one of Case 1 or Case 2. In some aspects, the UE 504 may refrain from calculating any parameter values for the LP UCI, as well.

In some instances, such as Option B, supra, one or more of the parameters of one or more of Equations 1-5 may still have different values for the HP UCI 422 and the LP UCI 424, e.g., even where the base station 502 configures some other values for some other parameters of one or more of Equations 1-5 for the mixed-priority UCI scheduled resources 556. Thus, in such instances, the UE 504 may calculate two different transmit powers: a first transmit power using the one or more values associated with the HP UCI 422, and a second transmit power using the one or more values associated with the LP UCI 424. The UE 504 may then select between the first and second transmit powers— e.g., the UE 504 may select the larger of the first and second transmit powers.

Having sufficient information to configure each of the parameters in Equation 1 with a corresponding value, the UE 504 may determine a transmit power for transmitting an uplink control channel transmission 538 including HP UCI 422 and LP UCI 424 on the mixed-priority UCI set of resources 556. For example, the UE may find $P_{PUCCH}$ according to Equation 1 using a first or second value for the open-loop power control parameter $P_0$, a first or second value for the delta parameter $\Delta_F$ specific to the PUCCH format, and/or a first or second value for the power adjustment parameter $\Delta_{TF}$. In another example, the UE 504 may find $P_{PUCCH}$ according to Equation 1 using a power adjustment parameter $\Delta_{TF}$ that is based on a first scale factor $K_1$ or a second scale factor $$K_1'.$$

The UE 504 may find $P_{PUCCH}$ as a dBm value, and then the UE 504 may configure a power level of transmit circuitry based on the dBm value of $P_{PUCCH}$ Accordingly, the UE 504 may transmit, to the base station 502 and using the determined transmit power, the uplink control channel transmission 538 having the HP UCI 422 multiplexed with the LP UCI 424. The uplink control channel transmission 538 may be transmitted on one of the HP UCI scheduled resources 552, the LP UCI scheduled resources 554, or the mixed-priority UCI scheduled resources 556. In the uplink control channel transmission, the HP UCI 422 may be encoded using a first code rate that is different (e.g., lower) than a second code rate used to encode the LP UCI 424.

Figure 6:
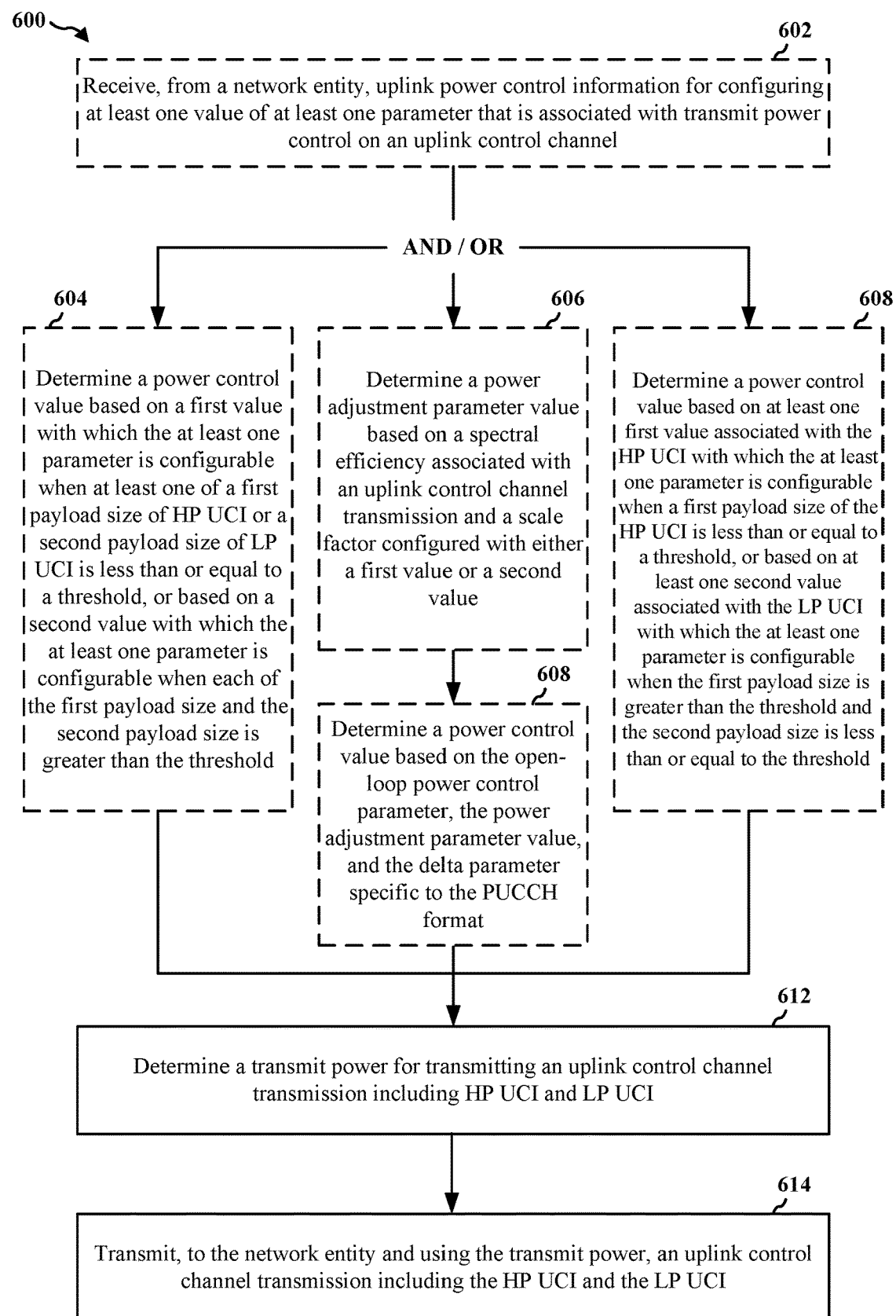
FIG. 6 is a flowchart illustrating an example of a method of wireless communication at a UE.

FIG. 6 is a flowchart 600 illustrating an example of a method of wireless communication at a UE. The method may be performed by or at a UE (e.g., one or more of the UEs 104, 350, 504), another wireless communications apparatus, or one or more components thereof. According to various different aspects, one or more of the illustrated blocks may be omitted, transposed, and/or contemporaneously performed.

At 602, the UE may receive, from a network entity, uplink power control information configuring at least one value for at least one parameter that is associated with transmit power control on an uplink control channel. In some aspects, the uplink power control information may be at least partially received from the network entity via RRC signaling. In some other aspects, the uplink power control information may be at least partially received from the network entity via broadcast signaling, such as at least one SIB. The uplink power control information configuring at least one value for at least one parameter may be used to find a transmit power in instances in which the UE is to transmit HP UCI multiplexed with LP UCI on an uplink control channel.

In one aspect, the uplink power control information may include information indicative of at least two values with which a parameter is configurable. For example, the uplink power control information may include two potential values for the open-loop power control parameter $P_0$, such as a first open-loop power control parameter value $$P_0^{(1)}$$

and a second open-loop power control parameter value $$P_0^{(2)}.$$

In some aspects, one of the first value $$P_0^{(1)}$$

or the second value $$P_0^{(2)}$$

may be offset from the other of the first value $$\Delta_F^{(1)}$$

or the second value $$\Delta_F^{(2)}$$

by a power boost value (e.g., 4.77 dB), which may be a constant or preconfigured value or may be configured by the network entity— i.e., $P_0^{(1)} = P_0^{(2)} + y,$ where y is the power boost value.

In another example, the uplink power control information may include two potential values for the delta parameter $\Delta_F$ specific to the PUCCH format of the uplink control channel transmission, such as a first delta parameter $$\Delta_F^{(1)}$$

and a second delta parameter $$\Delta_F^{(2)}.$$

In some aspects, one of the first value $$\Delta_F^{(1)}$$

or the second value $$\Delta_F^{(2)}$$

may be offset from the other of the first value $$\Delta_F^{(1)}$$

or the second value $$\Delta_F^{(2)}$$

by an offset value, which may be a constant or preconfigured value or may be configured by the network entity— e.g., $\Delta_F^{(1)} = \Delta_F^{(2)} + z,$ where z is the offset value.

In another aspect, the uplink power control information may include information indicative of one value with which a parameter is configurable, and the one value may be intended to replace another value in one of Equations 1-5 in certain situations. For example, the one value may be a second scale factor $$K_1'$$

intended to replace the first scale factor $K_1$ in certain situations to which Equation 3 is applicable.

Referring to FIG. 5, for example, the UE 504 may be configured to receive, from the base station 102/180, uplink power control information 536 for configuring at least one value of at least one parameter that is associated with transmit power control on an uplink control channel.

According to various different aspects of the present disclosure, the UE may be configured for one or more of the following (604, 606, 608, 610):

At 604, the UE may determine a power control value based on a first value with which the at least one parameter is configurable with a first value when at least one of a first payload size of the HP UCI or a second payload size of the LP UCI is less than or equal to a threshold, or based on a second value with which the at least one parameter is configurable when each of the first payload size and the second payload size is greater than the threshold. The second value may be different from the first value. In some aspects, the threshold may be a preconfigured or constant value, such as two (2), which may be defined in a standard or technical specification, such as those promulgated by 3GPP.

Referring to FIGS. 4-5, for example, the UE 504 may determine a power control value based on a first value with which the at least one parameter is configurable with a first value when at least one of a first payload size of the HP UCI 422 or a second payload size of the LP UCI 424 is less than or equal to a threshold, or based on a second value with which the at least one parameter is configurable when each of the first payload size and the second payload size is greater than the threshold. In other words, when finding $P_{PUCCH}$ according to Equation 1, the UE 504 may set the open-loop power control parameter $P_0$ to the first value when at least one of a first payload size of the HP UCI 422 or a second payload size of the LP UCI 424 is less than or equal to a threshold, or to the second value when each of the first payload size and the second payload size is greater than the threshold.

In some aspects, the at least one parameter may be at least one of the open-loop power control parameter $P_0$ and/or the delta parameter $\Delta_F$ specific to the PUCCH format of the uplink control channel transmission, which may be configured via RRC signaling from the network entity. In one example, the UE may select between a first value $$P_0^{(1)}$$

and a second value $$P_0^{(2)}$$

for configuring the open-loop power control parameter $P_0$ of Equation 1. In another example, the UE may select between a first value $$\Delta_F^{(1)}$$

and a second value $$\Delta_F^{(2)}$$

for configuring the delta parameter $\Delta_F$ of Equation 1.

The UE may calculate the power control value by using the selected value as the corresponding parameter value in Equation 1. For example, the UE may use the first value $$P_0^{(1)}$$

for the open-loop power control parameter $P_0$ (j) when at least one of a first payload size of the HP UCI or a second payload size of the LP UCI is less than or equal to a threshold. However, the UE may use the second value $$P_0^{(2)}$$

for the open-loop power control parameter $P_0$ (j) when each of the first payload size and the second payload size is greater than the threshold.

At 606, the UE may determine a power adjustment parameter value that is based on a spectral efficiency associated with an uplink control channel transmission and a scale factor configured with either a first value or a second value. The power adjustment parameter value may correspond to the power adjustment parameter $\Delta_{TF}$ of Equation 1. The spectral efficiency associated with the uplink control channel transmission may be given by BPRE, described with respect to Equations 3, 4, and 5, supra. The scale factor may be the value used to scale BPRE, as described with respect to Equation 3, supra.

When the payloads of both the HP UCI and the LP UCI are greater than a threshold (e.g., a two bit threshold), then the UE may determine the power adjustment parameter value using BPRE and $K_1$, as defined by Equation 3, supra. However, where at least one of the payloads of the HP UCI and/or the LP UCI is less than or equal to the threshold, then the UE may determine the power adjustment parameter value using BPRE and $$K_1', \text{ with } K_1'$$

replacing $K_1$ in Equation 3.

Similar to $K_1$ in Equation 3, $$K_1'$$

may be a scale factor; however, $$K_1'$$

may not be equal to $K_1$—e.g., $$K_1'$$

may be equal to six (6) or another value. In some aspects, $$K_1'$$

may be received in the uplink power control information from the network entity. In some other aspects, $$K_1'$$

may be preconfigured in memory or other storage of the UE—e.g., $$K_1'$$

may be set by a standard or other technical specification, such as those promulgated by 3GPP.

Thus, depending upon the payload(s) of the HP and/or LP UCIs, the UE may find a value of the power adjustment parameter $\Delta_{TF}$ equal to $10 \log_{10}$ (BPRE $K_1$) or $$10\log_{10}(BPRE \cdot K_1').$$

Referring to FIGS. 4-5, for example, the UE 504 may determine a value of the power adjustment parameter $\Delta_{TF}$ value based on $K_1$ as the scale factor in Equation 3 when each of a first payload size of the HP UCI 422 and a second payload size of the LP UCI 424 is greater than a threshold, or based on $$K_1'$$

as the scale factor in Equation 3 when at least one of the first payload size and/or the second payload size is less than or equal to the threshold.

At 608, the UE may determine a power control value based on the open-loop power control parameter, the power adjustment parameter value, and the delta parameter specific to the PUCCH format. That is, the UE may use a value of the power adjustment parameter $\Delta_{TF}$ that is derived based on either $K_1$ or $$K_1'$$

when evaluating Equation 1 to find $P_{PUCCH}$ according to Equation 1. The UE may also use a value of the open-loop power control parameter $P_0$ and a value of the delta parameter $\Delta_F$ to find $P_{PUCCH}$ according to Equation 1.

Referring to FIGS. 4-5, for example, the UE 504 may determine a power control value based on a first value of the open-loop power control parameter $P_0$, a second value of the power adjustment parameter $\Delta_{TF}$ derived based on either $$K_1',$$

and a third value of the delta parameter $\Delta_F$ specific to the PUCCH format. In other words, when finding $P_{PUCCH}$ according to Equation 1, the UE 504 may set the open-loop power control parameter $P_0$ to the first value, set the power adjustment parameter $\Delta_{TF}$ to the second value that is derived based on either $K_1$ or $$K_1',$$

and set the delta parameter $\Delta_F$ specific to the PUCCH format to the third value.

At 610, the UE may determine a power control value based on at least one first value associated with the HP UCI with which the at least one parameter is configurable when a first payload size of the HP UCI is less than or equal to a threshold or when each of the first payload size and a second payload size of the LP UCI is less than or equal to the threshold and a sum of the first payload size and the second payload size is greater than the threshold, or based on at least one second value associated with the LP UCI with which the at least one parameter is configurable when the first payload size is greater than the threshold and the second payload size is less than or equal to the threshold.

For example, the HP UCI and the LP UCI may have been separately scheduled as separate uplink control channel transmissions, and different values may be applicable to one or more of the open-loop power control parameter $P_0$, the delta parameter $\Delta_F$ specific to the PUCCH format, and/or the power adjustment parameter $\Delta_{TF}$ in different uplink control channel transmissions. Therefore, the UE may have a first $P_0$ value, a first $\Delta_F$ value, and/or a first $\Delta_{TF}$ value applicable to the uplink control channel transmission scheduled for the HP UCI, but a second $P_0$ value, a second $\Delta_F$ value, and/or a second $\Delta_{TF}$ value applicable to the uplink control channel transmission scheduled for the LP UCI. Therefore, the UE may be configured to select between one or more of the first and second $P_0$ values, first and second $\Delta_F$ values, and/or first and second $\Delta_{TF}$ values when evaluating Equation 1 for the uplink control channel transmission in which the HP UCI and LP UCI are multiplexed.

In some aspects, the UE may select the first $P_0$ value, first $\Delta_F$ value, and/or first $\Delta_{TF}$ value applicable to the uplink control channel transmission scheduled for the HP UCI when the HP UCI payload size is less than or equal to a threshold and the LP payload size is greater than the threshold. However, the UE may select the second $P_0$ value, second $\Delta_F$ value, and/or second $\Delta_{TF}$ value applicable to the uplink control channel transmission scheduled for the LP UCI when the HP UCI payload size is greater than the threshold and the LP UCI payload size is less than or equal to the threshold. When both the HP UCI and LP UCI payload sizes are less than or equal to the threshold, then the UE may select the first $P_0$ value, first $\Delta_F$ value, and/or first $\Delta_{TF}$ value applicable to the uplink control channel transmission scheduled for the HP UCI, such as where the sum of the HP UCI and LP UCI payload sizes is greater than the threshold.

The UE may then find $P_{PUCCH}$ according to Equation 1 using the selected one of the first $P_0$ value, first $\Delta_F$ value, and/or first $\Delta_{TF}$ value applicable to the uplink control channel transmission scheduled for the HP UCI or the second $P_0$ value, second $\Delta_F$ value, and/or second $\Delta_{TF}$ value applicable to the uplink control channel transmission scheduled for the LP UCI.

Referring to FIGS. 4-5, for example, the UE 504 may determine $P_{PUCCH}$ according to Equation 1 using a first $P_0$ value, first $\Delta_F$ value, and/or first $\Delta_{TF}$ value applicable to the HP UCI 422 when a first payload size of the HP UCI 422 is less than or equal to a threshold or when each of the first payload size and a second payload size of the LP UCI 424 is less than or equal to the threshold and a sum of the first payload size and the second payload size is greater than the threshold. However, the UE may determine $P_{PUCCH}$ according to Equation 1 using a second $P_0$ value, second $\Delta_F$ value, and/or second $\Delta_{TF}$ value applicable to the LP UCI 424 when the first payload size of the HP UCI 422 is greater than the threshold and the second payload size of the LP UCI 424 is less than or equal to the threshold.

It will be appreciated that some or all of the foregoing (604, 606, 608, 610) with which the UE may be configured are not mutually exclusive, and some or all of the various aspects described with respect to the foregoing (604, 606, 608, 610) may be combined or modified in various other aspects.

At 612, the UE may determine a transmit power for transmitting an uplink control channel transmission including HP UCI and LP UCI. For example, the UE may find $P_{PUCCH}$ according to Equation 1 using a first or second value for the open-loop power control parameter $P_0$, a first or second value for the delta parameter $\Delta_F$ specific to the PUCCH format, and/or a first or second value for the power adjustment parameter $\Delta_{TF}$ In another example, the UE may find $P_{PUCCH}$ according to Equation 1 using a power adjustment parameter $\Delta_{TF}$ that is based on a first scale factor $K_1$ or a second scale factor $$K_1'.$$

The UE may find $P_{PUCCH}$ as a dBm value, and then the UE may configure a power level of transmit circuitry based on the dBm value of $P_{PUCCH}$.

Referring to FIGS. 4-5, for example, the UE 504 may find $P_{PUCCH}$ according to Equation 1, and the UE 504 may set a power level for the uplink control channel transmission 538 on the mixed-priority UCI set of resources 556 based on a dBm value corresponding to $P_{PUCCH}$.

In some aspects, the UE may find a different $P_{PUCCH}$ value associated with the HP UCI than that associated with the LP UCI, the UE may find a different $P_{PUCCH}$ value associated with HP UCI having a payload size less than or equal to a threshold than that associated with HP UCI having a payload size greater than the threshold, etc. The UE may therefore determine which of the different $P_{PUCCH}$ values is more suitable for transmission of HP UCI multiplexed with LP UCI.

The UE may determine one or two transmission powers (e.g., as described herein). In some aspects, the UE may determine one transmission power (e.g., in Option A or elsewhere). In other aspects, the UE may determine two different transmission powers (e.g., as described with respect to Option B or elsewhere). In aspects where the UE may determine two different transmission powers, the UE may select between the two according to some criteria or condition. For example, the UE may calculate a first $P_{PUCCH}$ value based on a first set of parameter values (e.g., a set of parameters values associated with HP UCI), and the UE may calculate a second $P_{PUCCH}$ value based on a second set of parameter values (e.g., a set of parameter values associated with LP UCI). The UE may then select either the first $P_{PUCCH}$ value or the second $P_{PUCCH}$ value to apply to transmission of the HP UCI multiplexed with the LP UCI. In some aspects, the UE may select the larger of the first $P_{PUCCH}$ value or the second $P_{PUCCH}$ value to use for transmission of the HP UCI multiplexed with the LP UCI.

In some other aspects, the UE may elect to use parameters values associated with the HP UCI (and not the LP UCI), even though the HP UCI is multiplexed with the LP UCI. The UE may therefore refrain from calculating a second $P_{PUCCH}$ value using parameter values associated with the LP UCI. Illustratively, the UE may first determine whether the HP UCI payload size is less than or equal to a threshold (e.g., a two bit threshold associated with one or more uplink control channel formats). If the UE determines that the HP UCI payload size is less than or equal to the threshold, then the UE may calculate a $P_{PUCCH}$ value based on the HP UCI (e.g., based on parameter values associated with uplink control channel resources on which the HP UCI had been scheduled). The UE may use the $P_{PUCCH}$ value calculated based on the HP UCI and not based on the LP UCI for transmission of the HP UCI multiplexed with the LP UCI.

At 614, the UE may transmit, to the network entity and using the transmit power, an uplink control channel transmission including the HP UCI and the LP UCI. The HP UCI and the LP UCI may be multiplexed in the uplink control channel transmission. In some aspects, the HP UCI may have been scheduled on a first set of uplink control channel resources that overlaps in time with a second set of uplink control channel resources on which the LP UCI may have been scheduled. The uplink control channel transmission having the HP and LP UCIs may be transmitted on one of the first set of uplink control channel resources, the second set of uplink control channel resources, or a third set of uplink control channel resources that is different from the first and second sets of uplink control channel resources (although the third set may overlap with the first and/or second sets of uplink control channel resources). In the uplink control channel transmission, the HP UCI may be encoded using a first code rate that is different (e.g., lower) than a second code rate used to encode the LP UCI.

Referring to FIGS. 4-5, for example, the UE 504 may transmit, to the base station 502 and using the determined transmit power, the uplink control channel transmission 538 having the HP UCI 422 multiplexed with the LP UCI 424 on the mixed-priority UCI set of resources 556.

FIG. 7 is a flowchart 700 illustrating an example of a method of wireless communication at a network entity. The method may be performed by a, or at a, base station (e.g., one or more of the base stations 102/180, 310, 502), another wireless communications apparatus, or one or more components thereof. According to various different aspects, one or more of the illustrated blocks may be omitted, transposed, and/or contemporaneously performed.

At 702, the network entity may transmit, to a UE, uplink power control information for configuring at least one value of at least one parameter that is associated with transmit power control on an uplink control channel. In some aspects, the uplink power control information may be at least partially transmitted to the UE via RRC signaling. In some other aspects, the uplink power control information may be at least partially transmitted via broadcast signaling, such as in at least one SIB. The uplink power control information for configuring at least one value for at least one parameter may be used to find a transmit power in instances in which the network entity is to receive HP UCI multiplexed with LP UCI on an uplink control channel.

Referring to FIG. 5, for example, the base station 502 may be configured to transmit, to the UE 504, uplink power control information 536 for configuring at least one value of at least one parameter that is associated with transmit power control on an uplink control channel.

In some aspects, the uplink power control information may include information for configuring the at least one parameter to either a first value associated with at least one of a first payload size of HP UCI or a second payload size of LP UCI being less than or equal to a threshold (e.g., a threshold of two bits), or to a second value different from the first value associated with each of the first payload size and the second payload size being greater than the threshold, and the at least one parameter may be configured to either the first value or the second value at the UE, depending on the HP and/or LP UCI payload sizes. In some other aspects, the uplink power control information may include information for configuring the at least one parameter to either a first value when a payload size of the first UCI is less than or equal to a threshold, or a second value different from the first value when the payload size is greater than the threshold. In still other aspects, the uplink power control information may include information that is based on a sum of one of the first value or the second value and an offset value, such as information setting the other of the first value or the second value equal to the sum.

In one aspect, the uplink power control information may include information indicative of at least two values with which an uplink power control parameter is configurable. For example, the uplink power control information may include two potential values for the open-loop power control parameter $P_0$, such as a first open-loop power control parameter value $$P_0^{(1)}$$

and a second open-loop power control parameter value $$P_0^{(2)}.$$

In some aspects, one of the first value $$P_0^{(1)}$$

or the second value $$P_0^{(2)}$$

may be offset from the other of the first value $$\Delta_F^{(1)}$$

or the second value $$\Delta_F^{(2)}$$

by a power boost value (e.g., 4.77 dB), which may be a constant or preconfigured value or may be configured by the network entity—i.e., $$P_0^{(1)} = P_0^{(2)} + y,$$

where y is the power boost value.

In another example, the uplink power control information may include two potential values for the delta parameter $\Delta_F$ specific to the PUCCH format of the uplink control channel transmission, such as a first delta parameter $$\Delta_F^{(1)}$$

and a second delta parameter $$\Delta_F^{(2)}.$$

In some aspects, one of the first value $$\Delta_F^{(1)}$$

or the second value $$\Delta_F^{(2)}$$

may be offset from the other of the first value $$\Delta_F^{(1)}$$

or the second value $$\Delta_F^{(2)}$$

by an offset value, which may be a constant or preconfigured value or may be configured by the network entity—e.g., $$\Delta_F^{(1)} = \Delta_F^{(2)} + z,$$

where z is the offset value.

In another aspect, the uplink power control information may include information indicative of one value with which a parameter is configurable, and the one value may be intended to replace another value in one of Equations 1-5 in certain situations. For example, the one value may be a second scale factor $$K_1'$$

intended to replace the first scale factor $K_1$ in certain situations to which Equation 3 is applicable. The first and/or second scale factors may be associated with a total number of bits of both HP UCI and LP UCI being greater than a threshold (e.g., a threshold of two bits) and less than or equal to another threshold (e.g., another threshold of eleven bits) and a PUCCH format of an uplink control channel transmission configured to be used with the total number of bits.

In still other aspects, the uplink power control information may include information for configuring at least one parameter for either HP UCI scheduled on a first set of PUCCH resources or LP UCI scheduled on a second set of PUCCH resources. For example, the uplink power control information may include information for configuring one or more of an open-loop power control parameter, a delta parameter specific to a PUCCH format, a power adjustment parameter, or any combination thereof.

At 704, the base station may receive, from the UE based on the uplink power control information, an uplink control channel transmission including HP UCI and LP UCI. The HP UCI and the LP UCI may be multiplexed in the uplink control channel transmission. In some aspects, the HP UCI may have been scheduled on a first set of uplink control channel resources that overlaps in time with a second set of uplink control channel resources on which the LP UCI may have been scheduled. The uplink control channel transmission having the HP and LP UCIs may be received on one of the first set of uplink control channel resources, the second set of uplink control channel resources, or a third set of uplink control channel resources that is different from the first and second sets of uplink control channel resources (although the third set may overlap with the first and/or second sets of uplink control channel resources). In the uplink control channel transmission, the HP UCI may be encoded using a first code rate that is different (e.g., lower) than a second code rate used to encode the LP UCI.

Referring to FIGS. 4-5, for example, the base station 502 may receive, from the UE 504 based on the uplink power control information 536, the uplink control channel transmission 538 having the HP UCI 422 multiplexed with the LP UCI 424 on the mixed-priority UCI set of resources 556.

Further disclosure is included in the Appendix, which is expressly incorporated herein in its entirety.

The specific order or hierarchy of blocks or operations in each of the foregoing processes, flowcharts, and other diagrams disclosed herein is an illustration of example approaches. Based upon design preferences, the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a UE, including: determining a transmit power for transmitting an uplink control channel transmission including first UCI having a first priority and second UCI having a second priority that is lower than the first priority; and transmitting, to a network entity using the transmit power, the uplink control channel transmission including the first UCI having the first priority and the second UCI having the second priority.

Example 2 may include the method of example 1, and the first UCI is encoded using a first code rate that is different from a second code rate used to encode the second UCI.

Example 3 may include the method of example 1, and the first UCI is scheduled on a first at least one PUCCH resource that overlaps in time with a second at least one PUCCH resource on which the second UCI is scheduled.

Example 4 may include the method of example 3, and the uplink control channel transmission is transmitted on one of: the first at least one PUCCH resource, the second at least one PUCCH resource, or a third at least one PUCCH resource that is different from the first at least one PUCCH resource and the second at least one PUCCH resource.

Example 5 may include the method of example 1, and the transmit power is determined based on at least one parameter that is configured for either the first UCI or the second UCI.

Example 6 may include the method of example 5, and the at least one parameter includes at least one of: an open-loop power control parameter, a delta parameter specific to a PUCCH format, a power adjustment parameter, or scale factor associated with the power adjustment parameter.

Example 7 may include the method of example 6, and the power adjustment parameter is associated with a spectral efficiency corresponding to at least one of the first UCI or the second UCI.

Example 8 may include the method of example 6, and the at least one parameter is configurable with a first value when at least one of a first payload size of the first UCI or a second payload size of the second UCI is less than or equal to a threshold, and the at least one parameter is configurable with a second value different from the first value when each of the first payload size and the second payload size is greater than the threshold.

Example 9 may include the method of example 8, and the first value is based on a sum of the second value and an offset value.

Example 10 may include the method of example 8, and the threshold is equal to two (2) bits.

Example 11 may include the method of example 8, further including: determining a third value based on a spectral efficiency associated with the uplink control channel transmission and the scale factor configured with either the first value or the second value, and a total number of bits of both the first UCI and the second UCI is greater than the threshold and less than or equal to another threshold and the PUCCH format is configured to be used with the total number of bits; and determining a fourth value based on the open-loop power control parameter, the power adjustment parameter configured with the third value, and the delta parameter specific to the PUCCH format, and the transmit power is determined based on the fourth value.

Example 12 may include the method of example 11, and the second value is either preconfigured in storage accessible at the UE or received from the network entity, and the second value is greater than the first value.

Example 13 may include the method of example 8, and the at least one parameter is configured for either the first UCI scheduled on a first set of PUCCH resources or the second UCI scheduled on a second set of PUCCH resources.

Example 14 may include the method of example 13, and the at least one parameter includes at least one of the open-loop power control parameter, the delta parameter specific to the PUCCH format, the power adjustment parameter, or any combination thereof.

Example 15 may include the method of example 13, further including: determining a third value associated with the transmit power using the first value with which the at least one parameter is configured when a sum of a first payload size of the first UCI and a second payload size of the second UCI is greater than the threshold, and the at least one parameter is configured with the first value based on the first UCI having the first priority and not based on the second UCI having the second priority.

Example 16 may include the method of example 6, and the at least one parameter is configured with a first value when a payload size of the first UCI is less than or equal to a threshold, and the at least one parameter is configured with a second value different from the first value when the payload size is greater than the threshold.

Example 17 may include the method of example 6, and the at least one parameter is configured with at least one value based on uplink power control information received from the network entity.

Example 18 may include the method of example 1, further including: determining a first value associated with the transmit power based on the first UCI having the first priority; and determining a second value associated with the transmit power based on the second UCI having the second priority, and the transmit power with which the uplink control transmission is transmitted is determined based on at least one of the first value or the second value.

Example 19 may include the method of example 18, and the transmit power includes the first value when the first value is greater than the second value or the second value when the first value is less than the second value.

Example 20 may include the method of example 1, and the transmit power is determined based on an open-loop power control parameter, and: a first value corresponds to the open-loop power control parameter when at least one of a first payload size of the first UCI or a second payload size of the second UCI is less than or equal to a threshold, and a second value corresponds to the open-loop power control parameter when each of the first payload size and the second payload size is greater than the threshold.

Example 21 may include the method of example 1, and the transmit power is determined based on a delta parameter specific to a PUCCH format, and: a first value corresponds to the delta parameter specific to the PUCCH format when at least one of a first payload size of the first UCI or a second payload size of the second UCI is less than or equal to a threshold, and a second value corresponds to the delta parameter specific to the PUCCH format when each of the first payload size and the second payload size is greater than the threshold.

Example 22 may include the method of example 1, and the transmit power is determined based on a power adjustment parameter, and: a first value corresponds to the power adjustment parameter when at least one of a first payload size of the first UCI or a second payload size of the second UCI is less than or equal to a threshold, and a second value corresponds to the power adjustment parameter when each of the first payload size and the second payload size is greater than the threshold.

Example 23 may include the method of example 1, and the transmit power is determined based on a scale factor associated with a power adjustment parameter, and: a first value corresponds to the scale factor when at least one of a first payload size of the first UCI or a second payload size of the second UCI is less than or equal to a threshold, and a second value corresponds to the scale factor when each of the first payload size and the second payload size is greater than the threshold.

Example 24 may include the method of any of examples 20-23, and the threshold is equal to two (2) bits.

Example 25 may include the method of any of examples 20-23, and a difference between the first value and the second value corresponds to a coding gain difference.

Example 26 may include the method of example 25, and the coding gain difference is between 2 dB and 7 dB.

Example 27 may include the method of any of examples 20-23, further including receiving, from the network entity, information indicative of the first value or the second value.

Example 28 may include the method of any of examples 20-23, and the first value or the second value is determined based on information received from the network entity.

Example 29 may be a method of wireless communication at a network entity, including: transmitting, to a UE, uplink power control information for configuring at least one value of at least one parameter that is associated with transmit power control on an uplink control channel; and receiving, from the UE based on the uplink power control information, an uplink control channel transmission including first UCI having a first priority and second UCI having a second priority that is lower than the first priority.

Example 30 may include the method of example 29, and the first UCI is encoded with a first code rate that is different from a second code rate with which the second UCI is encoded.

Example 31 may include the method of example 29, and the first UCI is scheduled on a first at least one PUCCH resource that overlaps in time with a second at least one PUCCH resource on which the second UCI is scheduled.

Example 32 may include the method of example 31, and the uplink control channel transmission is received on one of: the first at least one PUCCH resource, the second at least one PUCCH resource, or a third at least one PUCCH resource that is different from the first at least one PUCCH resource and the second at least one PUCCH resource.

Example 33 may include the method of example 29, and the at least one parameter includes at least one of: an open-loop power control parameter, a delta parameter specific to a PUCCH format, a power adjustment parameter, or a scale factor associated with the power adjustment parameter.

Example 34 may include the method of example 33, and the power adjustment parameter is associated with a spectral efficiency corresponding to at least one of the first UCI or the second UCI.

Example 35 may include the method of example 29, and the at least one value includes at least one of a first value associated with at least one of a first payload size of the first UCI or a second payload size of the second UCI being less than or equal to a threshold, or a second value different from the first value associated with each of the first payload size and the second payload size being greater than the threshold, and the at least one parameter is configurable with at least one of the first value or the second value.

Example 36 may include the method of example 35, and the first value is a sum of the second value and an offset value.

Example 37 may include the method of example 35, and the threshold is equal to two (2) bits.

Example 38 may include the method of example 33, and the scale factor is associated with a total number of bits of both the first UCI and the second UCI being greater than a threshold and less than or equal to another threshold and a PUCCH format of the uplink control channel transmission configured to be used with the total number of bits.

Example 39 may include the method of example 33, and the at least one parameter is configured for either the first UCI scheduled on a first set of PUCCH resources or the second UCI scheduled on a second set of PUCCH resources.

Example 40 may include the method of example 39, and the at least one parameter includes at least one of the open-loop power control parameter, the delta parameter specific to the PUCCH format, the power adjustment parameter, or any combination thereof.

Example 41 may include the method of example 39, and the at least one value for the at least one parameter is based on the first UCI having the first priority and not based on the second UCI having the second priority, and at least one of a first payload size of the first UCI or a second payload size of the second UCI is less than or equal to a threshold and a sum of the first payload size and the second payload size is greater than the threshold.

Example 42 may include the method of example 29, and the at least one value for the at least one parameter includes either a first value when a payload size of the first UCI is less than or equal to a threshold, or a second value different from the first value when the payload size is greater than the threshold.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for.

What is claimed is:

1. An apparatus for wireless communication, comprising:
a memory; and
at least one processor coupled to the memory, wherein the at least one processor is configured to:
determine a transmit power for transmitting an uplink control channel transmission including first uplink control information (UCI) having a first priority and second UCI having a second priority that is lower than the first priority, wherein the transmit power is based on at least one parameter that is configured for either the first UCI or the second UCI, wherein the at least one parameter is configurable with a first value when at least one of a first payload size of the first UCI or a second payload size of the second UCI is less than or equal to a threshold, and the at least one parameter is configurable with a second value different from the first value when each of the first payload size and the second payload size is greater than the threshold; and
transmit, to a network entity using the transmit power, the uplink control channel transmission including the first UCI having the first priority and the second UCI having the second priority.

2. The apparatus of claim 1, wherein the first UCI is encoded based on a first code rate that is different from a second code rate used to encode the second UCI.

3. The apparatus of claim 1, wherein the first UCI is scheduled on a first at least one physical uplink control channel (PUCCH) resource that overlaps in time with a second at least one PUCCH resource on which the second UCI is scheduled.

4. The apparatus of claim 3, wherein to transmit the uplink control channel transmission, the at least one processor is configured to transmit the uplink control channel transmission on one of:
the first at least one PUCCH resource,
the second at least one PUCCH resource, or
a third at least one PUCCH resource that is different from the first at least one PUCCH resource and the second at least one PUCCH resource.

5. The apparatus of claim 1, wherein the at least one parameter comprises at least one of:
an open-loop power control parameter,
a delta parameter specific to a PUCCH format,
a power adjustment parameter, or
a scale factor associated with the power adjustment parameter.

6. The apparatus of claim 5, wherein the power adjustment parameter is associated with a spectral efficiency corresponding to at least one of the first UCI or the second UCI.

7. The apparatus of claim 1, wherein the first value is based on a sum of the second value and an offset value.

8. The apparatus of claim 1, wherein the threshold is equal to two (2) bits.

9. The apparatus of claim 6, wherein to determine the transmit power, the at least one processor is configured to:
determine a third value based on a spectral efficiency associated with the uplink control channel transmission, a number of resource elements associated with the uplink control channel transmission, and the scale factor configured with either the first value or the second value, wherein a total number of bits of both the first UCI and the second UCI is greater than the threshold and less than or equal to another threshold and the PUCCH format is configured to be used with the total number of bits;

determine a fourth value based on the open-loop power control parameter, the power adjustment parameter configured with the third value, and the delta parameter specific to the PUCCH format; and determine the transmit power based on the fourth value.

10. The apparatus of claim 9, wherein the second value is configured in storage accessible at the apparatus or the at least one processor is configured to receive the second value from the network entity, and wherein the second value is greater than the first value.

11. The apparatus of claim 5, wherein the at least one parameter is configured for either the first UCI scheduled on a first set of PUCCH resources or the second UCI scheduled on a second set of PUCCH resources.

12. The apparatus of claim 11, wherein the at least one parameter comprises at least one of the open-loop power control parameter, the delta parameter specific to the PUCCH format, or the power adjustment parameter.

13. The apparatus of claim 11, wherein the at least one processor is configured to:

determine a third value associated with the transmit power using the first value with which the at least one parameter is configured when a sum of the first payload size of the first UCI and the second payload size of the second UCI is greater than the threshold, wherein the at least one parameter is configured with the first value based on the first UCI having the first priority and not based on the second UCI having the second priority.

14. The apparatus of claim 5, wherein the at least one parameter is configured with the first value when the first payload size of the first UCI is less than or equal to the threshold, and the at least one parameter is configured with the second value different from the first value when the first payload size is greater than the threshold.

15. The apparatus of claim 5, wherein the at least one parameter is configured with at least one value based on uplink power control information from the network entity.

16. The apparatus of claim 1, wherein to determine the transmit power, the at least one processor is configured to:

determine the first value associated with the transmit power based on the first UCI having the first priority;

determine the second value associated with the transmit power based on the second UCI having the second priority; and determine the transmit power based on at least one of the first value or the second value.

17. The apparatus of claim 16, wherein the transmit power is based on the first value when the first value is greater than the second value or the second value when the first value is less than the second value.

18. An apparatus for wireless communication, comprising:

a memory; and at least one processor coupled to the memory, wherein the at least one processor is configured to:

determine a transmit power for transmitting an uplink control channel transmission including first uplink control information (UCI) having a first priority and second UCI having a second priority that is lower than the first priority, wherein the transmit power is based on a delta parameter specific to a PUCCH format, and wherein:

a first value corresponds to the delta parameter specific to the PUCCH format when at least one of a first payload size of the first UCI or a second payload size of the second UCI is less than or equal to a threshold, and a second value corresponds to the delta parameter specific to the PUCCH format when each of the first payload size and the second payload size is greater than the threshold; and transmit, to a network entity using the transmit power, the uplink control channel transmission including the first UCI having the first priority and the second UCI having the second priority.

19. An apparatus for wireless communication, comprising:

a memory; and at least one processor coupled to the memory, wherein the at least one processor is configured to:

determine a transmit power for transmitting an uplink control channel transmission including first uplink control information (UCI) having a first priority and second UCI having a second priority that is lower than the first priority, wherein the transmit power is based on a power adjustment parameter, and wherein:

a first value corresponds to the power adjustment parameter when at least one of a first payload size of the first UCI or a second payload size of the second UCI is less than or equal to a threshold, and a second value corresponds to the power adjustment parameter when each of the first payload size and the second payload size is greater than the threshold; and transmit, to a network entity using the transmit power, the uplink control channel transmission including the first UCI having the first priority and the second UCI having the second priority.

20. An apparatus for wireless communication, comprising:

a memory; and at least one processor coupled to the memory, wherein the at least one processor is configured to:

determine a transmit power for transmitting an uplink control channel transmission including first uplink control information (UCI) having a first priority and second UCI having a second priority that is lower than the first priority, wherein the transmit power is based on a scale factor associated with a power adjustment parameter, and wherein:

a first value corresponds to the scale factor when at least one of a first payload size of the first UCI or a second payload size of the second UCI is less than or equal to a threshold, and a second value corresponds to the scale factor when each of the first payload size and the second payload size is greater than the threshold; and transmit, to a network entity using the transmit power, the uplink control channel transmission including the first UCI having the first priority and the second UCI having the second priority.

21. An apparatus for wireless communication, comprising:

a memory; and at least one processor coupled to the memory, wherein the at least one processor is configured to:

determine a transmit power for transmitting an uplink control channel transmission including first uplink control information (UCI) having a first priority and second UCI having a second priority that is lower than the first priority, wherein the transmit power is based on an open-loop power control parameter, and wherein:

a first value corresponds to the open-loop power control parameter when at least one of a first payload size of the first UCI or a second payload size of the second UCI is less than or equal to a threshold, and a second value corresponds to the open-loop power control parameter when each of the first payload size and the second payload size is greater than the threshold; and transmit, to a network entity using the transmit power, the uplink control channel transmission including the first UCI having the first priority and the second UCI having the second priority.

22. The apparatus of claim 21, wherein the threshold is equal to two (2) bits.

23. The apparatus of claim 21, wherein a difference between the first value and the second value corresponds to a coding gain difference.

24. The apparatus of claim 23, wherein the coding gain difference is between 2 decibels (dB) and 7 dB.

25. The apparatus of claim 21, wherein the at least one processor is configured to receive, from the network entity, information indicative of the first value or the second value.

26. The apparatus of claim 21, wherein to determine the first value or the second value, the at least one processor is configured to receive information associated with the first value or the second value from the network entity.

\* \* \* \* \*